United States Patent Office

3,060,137
Patented Oct. 23, 1962

3,060,137
PREPARATION OF CELLULAR POLYURETHANE PLASTICS
Paul G. Gemeinhardt, Sistersville, and Robert L. Sandridge, Paden City, W. Va., assignors to Mobay Chemical Company, Pittsburgh, Pa., a corporation of Delaware
No Drawing. Filed May 3, 1960, Ser. No. 26,403
9 Claims. (Cl. 260—2.5)

This invention relates to cellular polyurethane plastics and a method of preparing the same and more particularly it relates to a method of preparing open-celled elastic foam by the one-shot technique which can be crushed, with complete recovery shortly after foaming.

It has been heretofore known to produce cellular products by the isocyanate-polyaddition process either by a two-step process, commonly referred to as the prepolymer method which contemplates an initial reaction to form a polyurethane polymer and a subsequent reaction to form a foam, or by a one-shot method in which the reactants are all mixed together substantially simultaneously. The former originally was the most practiced method, however, it suffers from the disadvantage that prior mixing and reactions are required before the foam producing step of the procedure can be conducted. The one-shot method is currently coming into favor because of its simplicity of simultaneously mixing the components of the foaming system and pouring the mixture into molds where the reaction which produces the cellular structure takes place.

Many of the presently known cellular polyurethane plastics prepared by the one-shot method suffer from the disadvantage that the cellular material cannot be crushed within a short period of time after the reaction ingredients, which have been mixed, are poured into a suitable mold. By a short period of time, a lapse in the vicinity of 10 to 15 minutes between pouring into a mold and crushing is meant. The term "crushing" means the compressing of the cellular material to a thickness less than its original thickness in order to cause the walls forming the cells to rupture, thus producing an open-celled product.

In the prepolymer method of preparing cellular polyurethane products, the resulting foam is crushed to open the cells generally between 30 and 45 minutes after the prepolymer is mixed with water and poured into a mold. As this at one time was the predominant method used, the equipment for making cellular polyurethane plastics has been designed so that the crushing rollers or other suitable equipment designed for crushing the foamed products are situated in a continuous process such that the foam block will reach the crushing means precisely at the appropriate time for carrying out the crushing operation.

Several techniques have been practiced heretofore to reduce the time necessary between the pouring operation and the crushing operation and to utilize the equipment designed for the preparation of cellular products by the prepolymer method. One such method is to utilize an organo-stannic-type catalyst such as, for example, dibutyltin di(2-ethyl hexoate). These stannic-type catalysts cause the rapid curing of the resulting cellular polyurethane plastics and thus permit the crushing after a relatively short time as compared to the prepolymer method. However, the foams formed by the processes utilizing the stannic-type catalysts degrade rapidly under dry oven aging conditions. It has been suggested to introduce into these reaction systems using the stannic-type catalysts, certain inhibitors which improve the aging properties. The majority of the foam manufacturers prefer tartaric acid because of its superior color properties. This additive, however, requires formulation changes and close supervision in order to compensate for the deactivating effect of the tartaric acid upon the stannic-type catalyst.

Another method for making one-shot polyurethane foams has been to use stannous-type catalysts such as, the stannous salts of carboxylic acids having from one to twenty carbon atoms. These materials are advantageous in that no degradation properties under high temperature conditions are encountered. However, the use of stannous-type catalysts requires a much longer curing period between the time of pouring the mixture of liquid reaction ingredients into a mold and crushing the resulting solid cellular material. The curing referred to throughout the specification and claims means the period of time under normal conditions between pouring the reaction mixture into a mold and crushing the cellular material, and not to what is considered by those skilled in the art as a post curing technique. Thus a continuous process requires a much longer time and more costly equipment. The period of time for this type of catalyst is in excess of one hour. This is wholly impractical because of the length of the conveyor which would be required and, therefore, is not commercially feasible. If an attempt to crush the stannous catalyzed cellular plastic is made without a long curing period, which may be as long as twenty-four hours in some cases, a detrimental effect on the cellular plastic results, which is the permanent densification of the center portion while the edges of the cellular material essentially remain unchanged. This densification of the center portion of the cellular product renders the entire molding unusable.

It is, therefore, an object of this invention to provide a one-shot method of making cellular polyurethane plastics. It is another object of this invention to provide a one-shot method of making polyurethane plastics utilizing stannous-type catalysts. It is still another object of this invention to provide a method of preparing polyurethane plastics utilizing a stannous type catalyst, which cellular polyurethane plastic may be crushed within short periods of time after mixing the reaction ingredients. It is a further object of this invention to provide a method of preparing a one-shot cellular polyurethane plastic utilizing an organo-stannous-type catalyst which can be crushed shortly after the reaction ingredients are poured into a mold while utilizing the processing equipment used in the prepolymer method. It is a still further object to provide a method of making a more resilient breathable one-shot polyurethane foam using a stannous-type catalyst.

The foregoing objects and others which will become apparent from the following description are accomplished in accordance with the invention, generally speaking by providing a method of making cellular polyurethane plastics, which method permits the crushing of the solid cellular material shortly after the initial reaction, wherein the reaction ingredients utilized in the preparation of polyurethane foams have incorporated therein in a mixing step prior to introducing the reaction mixture into a mold, a dihydroxybenzene. More particularly, this invention contemplates the preparation of cellular polyurethane plastics by a process which comprises mixing in a single step, an hydroxyl polyester or a polyhydric polyalkylene ether, an organic polyisocyanate, water, at least one tertiary amine catalyst to promote the reaction between the water and the isocyanate, a stannous salt of a carboxylic acid having from one to tweney carbon atoms, to promote the reaction between the polyhydroxy compound and the —NCO groups of the organic diisocyanate and a dihydroxybenzene, pouring the resulting mixture into a mold, permitting the foaming action to take place and crushing the resulting foam shortly thereafter.

As stated previously, the invention is suitable both for polyester and polyether cellular polyurethane plastics. Any suitable polyester having a molecular weight of at least about 700 may be used, such as, for example those prepared by reacting a polyhydric alcohol with a polycarboxylic acid. Any suitable polyhydric alcohol may be used such as, for example, ethylene glycol, propylene glycol, butylene glycol, amylene glycol, trimethylol propane, pentaerythritol, glycerine, 1,6-hexanediol and the like. Any suitable polycarboxylic acid may be used such as, for example, adipic acid, methyl adipic acid, oxalic acid, glutaric acid, pimelic acid, succinic acid, sebacic acid, azelaic acid, suberic acid, phthalic acid, isophthalic acid, terephthalic acid, 1,2,4-benzene tricarboxylic acid, maleic acid, malonic acid, fumaric acid, itaconic acid, citraconic acid, oleic acid, ricinoleic acid and the like. The polyesters of this invention also include the reaction products of diamines and amino-alcohols and mixtures of diamines, amino-alcohols and polyhydric alcohols with carboxylic acids which form polyesteramides. Any suitable diamine may be used such as, for example, ethylene diamine, hexamethylene diamine, p-amino-aniline and the like. Any suitable amino-alcohol may be used such as, for example, β-aminoethanol, 3-aminopropanol, 2-aminohexanol and the like. Of course, it should be understood that polymeric glycols may also be used in the preparation of the polyester such as, for example, diethylene glycol, triethylene glycol and higher polymers of ethylene glycol, propylene glycol and the like.

Any suitable polyhydric polyalkylene ether having a molecular weight of at least about 700 may be used such as, the condensation products of alkylene oxides such as, for example, ethylene oxide, propylene oxide, butylene oxide, amylene oxide and mixtures of two or more alkylene oxides. A polyalkylene ether glycol prepared by the polymerization of tetrahydrofuran may also be used. The polyhydric polyalkylene ethers suitable for use in the process of this invention may also be prepared by condensing one of the aforementioned alkylene oxides with a small amount of an organic compound containing active hydrogen containing groups such as, for example, water, ethylene glycol, propylene glycol, butylene glycol, amylene glycol, trimethylol propane, glycerine, pentaerythritol, hexanetriol, xylylene glycol and the like. The polyhydric polyalkylene ethers also include the reaction product of alkylene oxides with polyhydric thioethers such as, for example, thiodiglycol, 3,3'-dihydroxy propylsulfide, 4,4'-dihydroxy butylsulfide, 1,4-(β-hydroxy ethyl) phenylene dithioether and the like. The polyethers may be prepared by any of the known processes such as, for example, the process set forth by Wurtz in 1859 and described in the "Encyclopedia of Chemical Technology," volume 7, pages 257 to 262, published by Interscience Publishers, Inc. in 1951 or in U.S. Patent No. 1,922,459. A particularly suitable polyether for use in this invention is a polyalkylene ether triol prepared by condensing polypropylene oxide with glycerine until a polymer having a molecular weight of about 3,000 and an hydroxyl number of about 56 results.

The hydroxyl polyester or the polyhydric polyalkylene ether suitable for use in the process of this invention, should have a molecular weight of at least about 700 and preferably of from about 1,000 to about 10,000 and an hydroxyl number less than about 250 and preferably from about 30 to about 170. The polyesters should have an acid number of less than about 30 and preferably less than 5.

Any suitable organic polyisocyanate may be used in the preparation of cellular products in accordance with this invention such as, for example, ethylene diisocyanate, propylene diisocyanate, tetramethylene diisocyanate, pentamethylene diisocyanate, octamethylene diisocyanate, undecamethylene diisocyanate, dodecamethylene diisocyanate, 3,3'-diisocyanato dipropylether etc.; cyclopentylene-1,3-diisocyanate, cyclohexylene-1,4-diisocyanate, 2,4-tolylene diisocyanate, 2,6-tolylene diisocyanate and mixtures of 2,4- and 2,6-tolylene diisocyanate, xylylene-1,4-diisocyanate, xylylene-1,3-diisocyanate, 4,4'-diphenylmethane diisocyanate, 2-nitrodiphenyl-4,4'-diisocyanate, 4,4'-diphenyl propane diisocyanate, p-isocyanato benzyl isocyanate, m-phenylene diisocyanate, p-phenylene diisocyanate, naphthylene-1,4-diisocyanate, naphthylene-1,5-diisocyanate, furfurylidene diisocyanate, p,p',p''-triphenylmethane triisocyanate, diphenyl-4,6,4'-triisocyanate and the like.

In the preparation of the cellular polyurethane plastics in accordance with this invention, it is desired to have present in the reaction mixture a catalyst which primarily promotes the reaction between water and the isocyanate groups of the organic isocyanate, thus liberating carbon dioxide and causing the formation of the foam. For this purpose, tertiary amines have been found advantageous. Any suitable tertiary amine may be used in the method of this invention such as, for example, N-ethyl morpholine, N-methyl morpholine, tetramethyl-1,3-butane diamine, triethylene diamine, 1-methyl-4-dimethyl amino ethyl piperazine, 1-ethyl-4-diethyl amino ethyl piperazine, 1-butyl-4-dipropyl amino propyl piperazine, pyridine, diethyl ethanol amine and the like. The tertiary amine catalyst should be present in the reaction mixture in a quantity of from about 0.1 to about 5 parts by weight.

In the process of this invention when a polyhydric polyalkylene ether is utilized to prepare the cellular product, it is preferred that the reaction mixture contains an organosiloxane as a foaming stabilizer. Any silicone compound known to stabilize a reaction mixture of this type may be used. However, a siloxane oxyalkylene block polymer having the formula:

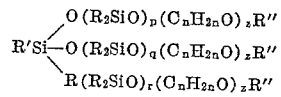

wherein R, R', and R'' are alkyl radicals having one to four carbon atoms; $p$, $q$ and $r$ are integers each having a value of from four to eight and $(C_nH_{2n}O)_z$ is a mixed polyoxyethylene oxypropylene group containing from 15 to 19 oxyethylene units and from 11 to 15 oxypropylene units with $z$ equal to from about 26 to about 34 is particularly advantageous. Organo-silicones of this type and a method of making them are disclosed in U.S. Patent 2,834,748.

Although all silicone compounds represented by the general formula given above are contemplated for use in the method of this invention, the preferred organosilicone compounds have the formula:

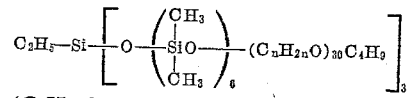

wherein $(C_nH_{2n}O)$ is a mixed polyoxyethylene and oxypropylene block copolymer containing about 17 oxyethylene units and 13 oxypropylene units.

When a polyester resin is used in practicing the process of this invention, it is preferred that an emulsifier be added to the reaction mixture. Any suitable emulsifier such as, for example, sulfonated castor oil, sulfonated natural oils, amine esters of fatty acids such as prepared from oleic acid and diethyl amine, ethylene oxide condensates of sorbitol esters of fatty acids, phenol and the like may be used. These emulsifiers may be used in an amount of from about 0.5 to about 10 parts by weight and preferably from about 1.5 to about 3 parts.

Any suitable stannous salt of a carboxylic acid having from one to twenty carbon atoms may be used in practicing the process of this invention for the catalysis of the reaction of the isocyanate groups with hydroxyl groups such as, for example, stannous acetate, stannous adipate, stannous benzoate, stannous napthanate, stannous butyrate, stannous caprate, stannous, caproate, stannous cinnamate, stannous citraconate, stannous formate, stannous hexoate, stannous octoate, stannous fumarate, stannous glutarate, stannous lactate, stannous laurate, stannous maleate, stannous malate, stannous malonate, stannous oleate, stannous palmitate, stannous phthalate, stannous propionate, stannous stearate, stannous suberate, stannous succinate, stannous tartrate, stannous toluylate and the like.

Any suitable dihydroxybenzene may be used in the process of the invention for the production of resilient polyurethane plastics capable of being crushed shortly after the reaction ingredients are poured into a suitable mold such as, for example, catechol and resorcinol, and substituted catechols, and resorcinols. These materials may be substituted on any of the unoccupied positions on the benzene ring by alkyl groups, alkoxy groups, halogen atoms and the like. Any alkyl radical may be substituted onto the benzene ring such as, for example, ethyl, propyl, butyl, amyl, hexyl, isopropyl, isobutyl, tertiary-butyl and the like. Although any alkyl radical may be used, it is preferred that the alkyl radical contain less than 8 carbon atoms. Any alkoxy group may be substituted onto the benzene ring such as, for example, methoxy, ethoxy, propoxy, butoxy and the like. Any halogen may be substituted onto the benzene ring such as chlorine, bromine, and the like. The dihydroxybenzenes contemplated by this invention may also be substituted in one or more positions, that is, more than one hydrogen attached to an aromatic carbon atom may be replaced by any of the above-mentioned groups. The only requirement for the substituted groups is that it does not react with either —NCO or hydroxyl groups.

In the method of this invention all of the ingredients, that is, the hydroxyl polyester or the polyhydric polyalkylene ether, the organic polyisocyanate, water, the tertiary amine catalyst, the silicone copolymer or emulsifier, the stannous salt and the dihydroxybenzene compound are simultaneously mixed with each other by any suitable means and then poured into a mold where the foaming reaction takes place. Any suitable mixing-type apparatus may be used, however, the mixer set forth in U.S. Patent Re. 24,514 is especially suitable. The mixing device may have any number of conduits leading thereto for introducing the different ingredients. For example, there may be one conduit for each ingredient or there may be a number less than the number of different ingredients. If the number of conduits is less than the total number of ingredients utilized, of course, it will be necessary to combine several of the ingredients prior to introducing into the mixer. The ingredients may be combined in any suitable manner, the only requirement being that premature reaction should not occur prior to introducing into the mixer. Thus, the isocyanate and the water would not be combined into a solution and introduced into the mixer for the reason that the isocyanate and the water would prematurely react to form urea groups. Also the isocyanate and the polyhydroxyl compound would not generally be combined prior to introducing into the mixer for the reason that reaction will occur. However, in certain circumstances, it would be possible for these ingredients to be admixed prior to introduction into the mixer. It is generally undesirable to premix the stannous salt with the silicone copolymer for the reason that the stannous compounds also cause the further polymerization of the silicone compounds. However, if the material is to be used within short periods after the mixture is first accomplished, no detrimental effects will result by admixing the stannous compound with the silicone compound. It is also undesirable to premix the dihydroxybenzene compound with the stannous salt for the reason that coagulation will generally occur.

In the preparation of cellular polyurethane plastics by the one-shot method, the organic polyisocyanate is utilized preferably in an amount which is the stoichiometric equivalent of the active hydrogen containing groups of the other reactants. In some instances, the percentage of —NCO groups present may be slightly less or greater than that required to react with all of the hydroxyl groups. The preferred quantity of —NCO groups is preferably from about 0.9 to about 1.2 for each hydrogen atom supplied by the polyester or polyether and water.

Only a small amount of water is required to cause the foaming of the mixture after it is introduced into a suitable mold. An amount of from about 0.5 to about 5.0 parts based on the weight of the polyhydroxyl resin may be used, depending upon the density of the resulting foam desired. The organosilicone utilized to stabilize foaming may be used in an amount from about 0.1 to about 5 parts by weight. It has been found, however that for best results from about 0.5 to about 1.5 parts based on the weight of the polyhydroxyl resin be used.

With respect to the stannous salt, the amount used, of course, depends upon the particular carboxylic acid used and its catalytic effect on the reaction between the isocyanato groups and the active hydrogen containing groups of the hydroxyl polyester or polyhydric polyalkylene ether. However, it may be generally stated that at least 0.15 part per 100 parts of polyhydroxyl resin will produce the desired effect. A range of from about 0.15 to about 5 parts per 100 parts of polyhydroxyl resins is suitable. It is preferred, however, that from about 0.25 part to about 1.5 parts per 100 parts of the polyhydroxyl resin be used.

With respect to the dihydroxybenzene, from about 0.1 to about 2 parts per 100 parts of the polyhydroxyl compound should be used in order to achieve the desired result which is to permit the crushing of the resulting foam within short periods of time after the reaction mixture is poured into suitable molds. It is preferred that from 0.2 to about 0.6 part to 100 parts of the polyhydroxyl resin be uesd. It was not to be expected that when using this small quantity of a dihydroxybenzene compound in conjunction with stannous salts of carboxylic acids in the production of polyurethane foams that the period of time required for satisfactory crushing of the cellular product would be reduced by such a large extent. As stated previously, although the stannous-type catalysts produce cellular plastics having superior heat degradation properties then do the stannic-type catalysts, the stannous-type was impractical for the reason that too long a period of delay was necessary before the foam could be crushed. By the addition of these small quantities of dihydroxybenzene compounds, the stannous-type catalyzed polyurethane foams are not only rendered practical, but are superior to the other types in that no degradation occurs at high temperatures.

The method of this invention is particularly suitable in the manufacture of cellular plastics to be utilized in the furniture industry. The cellular plastics destined for cushions and other purposes must be crushed not only to open the cells to permit the foam to "breathe," but also to even out load bearing. Cellular polyurethane plastics of the present invention have found wide spread utility in the production of cushions such as are used in upholstered articles, topper pads for automobile seats, crash pads and arm rests for automobiles and the like. Moreover the products of this invention are useful for both sound and thermal insulation.

The invention is further illustrated by the following examples in which the parts are per 100 parts of the polyhydroxyl resin unless otherwise specified.

*Example 1*

The following reaction ingredients are admixed in a mixing device as disclosed in U.S. Re. Patent 24,514 having four entrance conduits at the upper portion of the mixer. About 100 parts of a polyhydric polyalkylene ether prepared by condensing propylene oxide with glycerine until a product having a molecular weight of about 3,000 and an hydroxyl number of 56 results are introduced through one conduit. About 38 parts of a mixture of 80% 2,4-tolylene diisocyanate and 20% 2,6-tolylene diisocyanate are introduced through a second conduit. About 0.5 part of N-ethyl morpholine, about 0.1 part tetramethyl-1,3-butane diamine and about 0.3 part stannous octoate are introduced through a third conduit. About 1.0 part of a silicone copolymer having the formula:

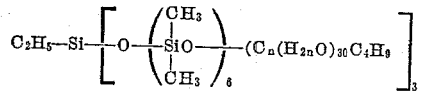

About 2.9 parts water and about 0.4 part resorcinol are introduced through a fourth conduit. The reactants and other ingredients are intimately mixed in the mixing device and poured into a suitable mold. A 10 in. block of cellular material results which is crushed after 15 minutes by passing through rollers which compress the cellular product initially to a height of 50% of its original height, then to a height of 75% of its original height and finally to a height of 95% of its original height. That is, the 10 in. block is compressed first to 5 in. then to 2.5 in. and finally to 1 in. After the final compression, the block regained its original dimensions.

A comparison product made without the addition of resorcinol could not be crushed even after a period of 1 hour after being poured into the mold without serious densification in the center of the block occurring.

*Example 2*

Utilizing the procedure set forth in Example 1, a cellular plastic is obtained from the following reaction ingredients. About 100 parts of a polyhydric polyalkylene ether prepared by condensing propylene oxide and glycerine to a molecular weight of about 3,000, an hydroxyl number of 56 and about 0.5 part catechol are introduced through one conduit. About 43.7 parts of a mixture of 80% 2,4-tolylene diisocyanate and 20% 2,6-tolylene diisocyanate are introduced through a second conduit and about 3.5 parts water through a third conduit. Through a fourth conduit, are added about 0.5 part N-ethyl morpholine, about 0.1 part 1-methyl-4-dimethyl aminoethyl piperazine, about 1.0 part of the silicone compound set forth in Example 1 and about 0.3 part stannous octoate. The resulting cellular polyurethane is compressed in accordance with the procedure set forth in Example 1. After removing the cellular block from the crushing rollers, it completely recovers to its original height.

*Example 3*

About 100 parts of the polyhydric polyalkylene ether of Example 1, about 38 parts of the tolylene diisocyanate of Example 1, about 2.9 parts of water, about 1 part of the silicone compound of Example 1, about 0.1 part tetramethyl-1,3-butane diamine, about 0.4 part stannous octoate, about 0.5 part N-ethyl morpholine and about 0.4 part tertiary butyl catechol are introduced into a mixing device in accordance with the procedure of Example 1. The resulting block is cut into two parts. The first part was crushed in acocrdance with Example 1, by first decreasing the cross-sectional thickness by 50%, 75%, 95%, and then permitting the foam to recover. The cellular block recovered to its original height. The second block was crushed by compressing the block initially to 95% of its original height. The block recovered to its original height without any densification occurring.

*Example 4*

The following ingredients are admixed in accordance with the procedure set forth in Example 1. About 100 parts of an hydroxyl polyester prepared by reacting about 16 mols of diethylene glycol and about 1 mol of trimethylol propane with about 15 mols of adipic acid until a polymer having a molecular weight of about 2,000 and an hydroxyl number of about 60 results are instantaneous- ly mixed with about 46 parts by weight of a mixture of 65% 2,4-tolylene diisocyanate and 35% 2,6-tolylene diisocyanate, about 1.2 parts by weight of dimethyl benzyl amine, about 3.2 parts by weight of water, about 1.0 part by weight of an emulsifier prepared from oleic acid and diethyl amine, about 1.5 parts by weight of sulfonated natural oil, about 0.3 part by weight of stannous octoate and about 0.5 part by weight of catechol. The resulting resilient cellular polyurethane plastic is crushed in accordance with the procedure set forth in Example 1 after a 15 minute curing period. The cellular block recovered to its original dimensions.

It is, of course, to be understood that this invention is not to be limited by the examples, but that any of the isocyanates set forth above or any of the methods of preparing the polyhydroxyl compounds set forth above may be substituted for those set forth in the examples. Also, any of the stannous-type catalysts, other suitable silicone compounds and any of the dihydroxybenzene compounds listed above may be utilized in place of those set forth in the examples.

Although the invention has been described in considerable detail for the purpose of illustration, it is to be understood that variations may be made therein by those skilled in the art without departing from the spirit of the invention and the scope of the claims.

What is claimed is:

1. In the preparation of a cellular polyurethane plastic by a process which comprises reacting an organic compound selected from the group consisting of hydroxyl polyesters prepared by the process which comprises reacting a polyhydric alcohol with a polycarboxylic acid and polyhydric polyalkylene ethers, said organic compound having a molecular weight of at least 700, water and an organic polyisocyanate, the improvement which comprises effecting the reaction with a mixture comprising a tertiary amine catalyst, the stannous salt of a carboxylic acid having from about 1 to about 20 carbon atoms, and a member selected from the group consisting of catechol, resorcinol, substituted catechols and substituted resorcinols, the substituted groups being free from groups reactive with —NCO and hydroxyl groups, and crushing the resulting cellular product shortly thereafter to rupture substantially all the cells.

2. In the preparation of cellular polyurethane plastics by a process which comprises simultaneously mixing an organic polyisocyanate, water, an organic compound selected from the group consisting of hydroxyl polyesters prepared by the process which comprises reacting a polyhydric alcohol with a polycarboxylic acid and polyhydric polyalkylene ethers, a tertiary amine catalyst, a stannous salt of a carboxylic acid having from 1 to 20 carbon atoms, the improvement which comprises simultaneously mixing the aforesaid ingredients with a member selected from the group consisting of catechol, resorcinol, substituted catechols and substituted resorcinols, the substituted groups being free from groups reactive with —NCO and hydroxyl groups, pouring said mixture into a mold and crushing the resulting cellular product shortly thereafter to rupture substantially all of the cells.

3. In the preparation of cellular polyurethane plastics by a process which comprises reacting a polyhydric polyalkylene ether having a molecular weight of at least about 700, an organic polyisocyanate, water and a tertiary amine catalyst, the improvement which comprises carrying out said reaction in the presence of a stannous salt of a carboxylic acid having from about 1 to about 20 carbon atoms, a stabilizer containing a siloxane oxyalkylene block copolymer having the formula:

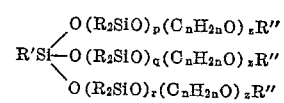

wherein R, R' and R" are alkyl radicals having 1 to 4 carbon atoms; $p$, $q$, and $r$ are integers each having the value of from about 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34, and a member selected from the group consisting of catechol, resorcinol, substituted catechols and substituted resorcinols, the substituted groups being free from groups reactive with —NCO and hydroxyl groups, pouring the resulting mixture into a mold and crushing the resulting cellular product within about 15 minutes after said pouring step to rupture substantially all of the cells.

4. A method of making cellular resilient polyurethane plastics which comprises mixing a polyhydric polyalkylene ether having a molecular weight of at least 700, an organic polyisocyanate, water, a tertiary amine catalyst, a stabilizer containing a siloxane oxyalkylene block copolymer having the formula:

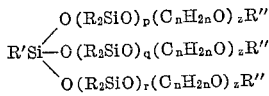

wherein R, R' and R" are alkyl radicals having 1 to 4 carbon atoms; $p$, $q$ and $r$ are integers each having the value of from about 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34, a stannous salt of a carboxylic acid having from 1 to 20 carbon atoms and a member selected from the group consisting of catechol, resorcinol, substituted catechols and substituted resorcinols, the substituted groups being free from groups reactive with —NCO and hydroxyl groups, pouring the mixture into a mold and crushing the resulting cellular product within about 15 minutes after said pouring step to rupture substantially all of the cells.

5. A method of making cellular resilient polyurethane plastics which comprises admixing a polyhydric polyalkylene ether having a molecular weight of at least 700, an excess of an organic polyisocyanate, water, a tertiary amine catalyst, from about 0.1 to about 5 parts of a stabilizer containing a siloxane-oxyalkylene block copolymer having the formula:

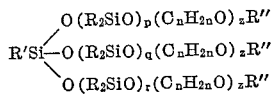

wherein R, R' and R" are alkyl radicals having 1 to 4 carbon atoms; $p$, $q$ and $r$ are integers each having a value of from about 4 to 8 and $(C_nH_{2n}O)_z$ is a mixed poly oxyethylene oxypropylene group containing from 15 to 19 oxyethylene units and from 11 to 15 oxypropylene units with $z$ equal to from about 26 to about 34, at least about 0.15 part per 100 parts of said polyalkylene ether of a stannous salt of a carboxylic acid having from 1 to 20 carbon atoms and from about 0.1 to about 2.0 parts per 100 parts of said polyalkylene ether of a member selected from the group consisting of catechol, resorcinol, substituted catechols and substituted resorcinols, the substituted groups being free from groups reactive with —NCO and hydroxyl groups, pouring said resulting mixture into a mold, curing the resulting cellular material for from about 10 to abot 15 minutes and immediately crushing the said cellular material to open the cells of said cellular material.

6. A method of making cellular resilient polyurethane plastics which comprises admixing the condensate of propylene oxide and glycerine having a molecular weight of about 3,000 and an hydroxyl number of about 56 with an excess of tolylene diisocyanate, water, a tertiary amine catalyst, from about 0.1 to about 5 parts of a stabilizer containing a siloxane-oxyalkylene block copolymer having the formula:

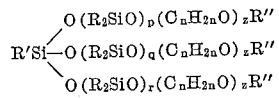

wherein R, R' and R" are alkyl radicals having 1 to 4 carbon atoms; $p$, $q$, and $r$ are integers each having a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34, at least about 0.15 part per 100 parts of said condensate of a stannous salt of a carboxylic acid having from 1 to 20 carbon atoms and from about 0.1 to about 2.0 parts per 100 parts of said condensate of a member selected from the group consisting of catechol, resorcinol, substituted catechols and substituted resorcinols, the substituted groups being free from groups reactive with —NCO and hydroxyl groups, pouring said resulting mixture into a mold, curing the resulting cellular material for from about 10 to 15 minutes and crushing the said cellular material to open the cells of said cellular material.

7. A method of producing cellular polyurethane plastics capable of being crushed shortly after being poured into a mold which comprises mixing a member selected from the group consisting of hydroxyl polyesters prepared by the process which comprises reacting a polyhydric alcohol with a polycarboxylic acid and polyhydric polyalkylene ethers, an organic polyisocyanate, water, a tertiary amine catalyst, a stannous salt of a carboxylic acid having from 1 to 20 carbon atoms and a member selected from the group consisting of catechol, resorcinol, substituted catechols and substituted resorcinols, the substituted groups being free from groups reactive with —NCO and hydroxyl groups, pouring said mixture into a mold, permitting said mixture to form a cellular product, and crushing said cellular product to rupture substantially all of the cells.

8. The method of claim 7 wherein the group member is an hydroxyl polyester.

9. The method of claim 7 wherein the group member is a polyhydric polyalkylene ether.

References Cited in the file of this patent
UNITED STATES PATENTS

| | | |
|---|---|---|
| 2,602,783 | Simon et al. | July 8, 1952 |
| 2,834,748 | Bailey et al. | May 13, 1958 |
| 2,915,496 | Swart et al. | Dec. 1, 1959 |
| 2,957,832 | Gmitter et al. | Oct. 25, 1960 |

OTHER REFERENCES

Mobay: "Technical Information Bulletin," Mobay Chemical Company, Pittsburgh 34, Pa., TIB No. 28–F9, July 20, 1959; 3 pages.